US012781126B2

(12) United States Patent
Wood et al.

(10) Patent No.: US 12,781,126 B2
(45) Date of Patent: Nov. 3, 2026

(54) NON-TRIAZOLE COMPOUNDS AND METHODS FOR INHIBITING CORROSION USING NON-TRIAZOLE COMPOUNDS

(71) Applicant: CHEMTREAT, INC., Glen Allen, VA (US)

(72) Inventors: Patrick Wood, Midlothian, VA (US); Santanu Banerjee, Glen Allen, VA (US); Prasad Kalakodimi, Glen Allen, VA (US); Curt Turner, Richmond, VA (US); Will Henderson, Midlothian, VA (US)

(73) Assignee: CHEMTREAT, INC., Glen Allen, VA (US)

( * ) Notice: Subject to any disclaimer, the term of this patent is extended or adjusted under 35 U.S.C. 154(b) by 573 days.

(21) Appl. No.: 18/235,992

(22) Filed: Aug. 21, 2023

(65) Prior Publication Data

US 2024/0101902 A1 Mar. 28, 2024

Related U.S. Application Data

(60) Provisional application No. 63/404,353, filed on Sep. 7, 2022.

(51) Int. Cl.
*C09K 15/22* (2006.01)
*C23F 11/10* (2006.01)
*C23F 11/14* (2006.01)

(52) U.S. Cl.
CPC .............. *C09K 15/22* (2013.01); *C23F 11/10* (2013.01); *C23F 11/149* (2013.01)

(58) Field of Classification Search
None
See application file for complete search history.

(56) References Cited

U.S. PATENT DOCUMENTS 5,194,639 A 3/1993 Connor et al.
5,334,764 A * 8/1994 Scheibel ............... C07C 233/18 564/489
5,625,098 A * 4/1997 Kao ...................... C07C 213/02 564/480

(Continued)

FOREIGN PATENT DOCUMENTS

EP 3181668 A1 * 6/2017 ............. C11D 1/525
EP 3670495 A1 * 6/2020 ............. C11D 1/645
WO 2016098016 A1 6/2016

OTHER PUBLICATIONS

Aslam, R., et al., "Effectiveness of some non-ionic surfactants as biodegradable corrosion inhibitor for low carbon steel in NaCl solution", Online Conference Paper, pp. 1-11, 2016; Retrieved on Oct. 7, 2023 from the Internet: [URL: <https://www.researchgate.net/publication/318572567_Effectiveness_of_some_non-ionic_surfactants_as_biodegradeable_corrosion_inhibitor_for_low_carbon_steel_in_nacl_solution>]; abstract; p. 2, first paragraph; p. 3, second paragraph.

(Continued)

*Primary Examiner* — Joseph D Anthony
(74) *Attorney, Agent, or Firm* — Oliff PLC

(57) ABSTRACT

Non-triazole compounds are provided that can be effective to inhibit corrosion of a corrodible metal surface in an aqueous system. The non-triazole compounds show comparable or better corrosion inhibition as compared to conventional triazole corrosion inhibitors, and have low toxicity and good stability in the presence of halogens such as halogen-containing biocides or free chlorine.

15 Claims, 2 Drawing Sheets

(56) References Cited

U.S. PATENT DOCUMENTS

| | | | | |
|---|---|---|---|---|
| 5,646,318 | A * | 7/1997 | Dery | C07C 231/02 554/68 |
| 5,750,748 | A | 5/1998 | Boutique et al. | |
| 5,798,331 | A * | 8/1998 | Anderson | C07C 233/20 510/501 |
| 2006/0033076 | A1 | 2/2006 | Hafner et al. | |
| 2009/0184287 | A1 | 7/2009 | Chang | |
| 2016/0229726 | A1 | 8/2016 | Felipe et al. | |
| 2017/0101606 | A1 * | 4/2017 | Klug | C10M 133/56 |
| 2017/0218293 | A1 * | 8/2017 | Klug | C11D 3/0073 |
| 2017/0260475 | A1 | 9/2017 | Zhang et al. | |
| 2017/0356093 | A1 | 12/2017 | Kalakodimi et al. | |
| 2018/0119289 | A1 * | 5/2018 | Hatchman | C23F 11/145 |
| 2020/0017752 | A1 * | 1/2020 | Wylde | C23F 11/08 |

OTHER PUBLICATIONS (National Center for Biotechnology Information) "(2R, 3S, 4R, SR)-N-[3-(tert-butylamino) propyl]-2, 3, 4, 5, 6-pentahydroxyhexanamide: Pubchem CID 138649642" Pubchem entry (online), pp. 1-9, Jul. 20, 2019; Retrieved on Oct. 8, 2023 from the Internet: [<URL: https://pubchem.ncbi.nlm.nlh.gov/compound/138649642>] p. 2 see 2D structure.

(National Center for Biotechnology Information) "(2R, 3S, 4R, SR)-2, 3, 4, 5, 6-pentahydroxy-1-morpholin-4-ylhexan-1-one: Pubchem CID 121428311" Pubchem entry (online), pp. 1-9, Aug. 6, 2016; Retrieved on Oct. 7, 2023 from the internet: [URL: <https://pubchem.ncbi.nlm.nih.gov/compound/121428311>]; see p. 2, see 2D structure.

(National Center for Biotechnology Information) "2-hydroxypropyl N-butylcarbamate: Pubchem CID 12437666" Pubchem entry (online), pp. 1-10, Feb. 8, 2007; Retrieved on Oct. 9, 2023 from the Internet: [URL: <https://pubchem.ncbi.nlm.nih.gov/compound/12437666>]; p. 2, see 2D structure.

Nov. 13, 2023 International Search Report issued in International Patent Application No. PCT/US2023/029320.

* cited by examiner

NON-TRIAZOLE COMPOUNDS AND METHODS FOR INHIBITING CORROSION USING NON-TRIAZOLE COMPOUNDS

CROSS-REFERENCE TO RELATED APPLICATION

This application claims the earlier filing date benefit of U.S. Application No. 63/404,353, which was filed on Sep. 7, 2022, the entirety of which is incorporated by reference herein.

TECHNICAL FIELD

This application relates generally to non-triazole compounds and their use as corrosion inhibitors to inhibit corrosion in aqueous systems.

BACKGROUND

Corrosion of metal surfaces in water systems is a serious problem. Corrosion can cause undesirable consequences, including loss of heat transfer, increased cleaning frequency, equipment repairs and replacements, shutdowns, environmental problems and the increasing resources and costs associated with each. Some causes of increased corrosion of metal surfaces include high dissolved solids, acidic environments, elevated temperatures, microbiological growth, organic and mineral deposits, and fluids that contain relatively high concentration of gases such as oxygen, hydrogen sulfide, or carbon dioxide.

Ferrous metals such as stainless steel are commonly used in industrial water systems such as for heat exchangers in cooling waters. Stainless steel has good mechanical and physical properties for long service life, as well as generally good corrosion resistance. However, even stainless steel can be subject to pitting and crevice corrosion.

Copper and its alloys (all referred to generally as "yellow metals") are also commonly used in cooling water treatment systems for heat exchanger tubing, pump impellers, and various other applications due to the natural corrosion resistance and high thermal conductivity of these metals. However, copper and its alloys are not immune to corrosion in cooling water applications especially in the presence of halogen based oxidizing biocides such as hypochlorous acid (HOCl) or hypobromous acid (HOBr). Current corrosion inhibitors for copper and its alloys include triazole-based compounds, i.e., a heterocyclic compound that includes a five-membered ring of two carbon atoms and three nitrogen atoms. Conventional triazole corrosion inhibitors include tolyltriazole (TT), benzotriazole (BZT), and chlorinated tolyltriazole (Cl-TT). The triazoles work as yellow metal corrosion inhibitors by forming an inhibitor film on the surface of yellow metals through bonding with copper. However, the film formed by triazoles can be disrupted by halogen-based biocides (e.g. HOCl), which can lead to corrosion and equipment failure. The film formed by triazoles on the metal surface is also affected by high free chlorine and it requires additional triazole to re-passivate the film for corrosion protection. Additionally, in the bulk water, the triazole inhibitor can react and be degraded by halogen-containing biocide and its corrosion inhibition capacity reduced. Triazole inhibitors and their halogenated derivatives also have high aquatic toxicity which can limit their application in industrial cooling water treatment, and the raw materials required to manufacture triazoles are often impacted by cost fluctuation and supply chain vulnerability.

These and other issues are addressed by the present disclosure.

SUMMARY

According to one aspect, this disclosure provides a method of inhibiting corrosion of a corrodible metal surface that contacts a water stream in a water system. The method includes introducing into the water stream at least one non-triazole compound that is selected from a compound that is represented by Formula (I), Formula (II), or Formula (III) below.

(I)

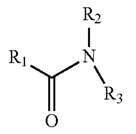

(II)

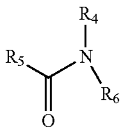

(III)

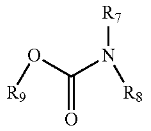

in which $R_1$ is a polyhydroxy group; $R_2$ and $R_3$ are independently selected from a hydrogen or a hydrocarbon group with the proviso that at least one of $R_2$ and $R_3$ includes a hydrocarbon group; $R_4$ is a polyhydroxy group; $R_5$ is a hydrocarbon group; $R_6$ is a hydrogen or a hydrocarbon group; $R_7$ and $R_8$ are independently selected from a hydrogen or a hydrocarbon group with the proviso that at least one of $R_7$ and $R_8$ includes a hydrocarbon group; and $R_9$ is a hydrocarbon group that includes at least one hydroxyl group.

According to another aspect, this disclosure provides A method of inhibiting corrosion of a yellow metal that contacts a water stream in a water system. The method includes introducing into the water stream at least one non-triazole compound that is selected from a compound that is represented by Formula (I):

(I)

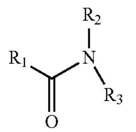

in which R1 is a polyhydroxy group with 3 to 10 carbon atoms and 2 to 9 hydroxyl groups, and R2 and R3 are independently selected from a hydrogen or a hydrocarbon group with the proviso that at least one of R2 and R3 includes a hydrocarbon group with 3 to 10 carbon atoms. The non-triazole compound is introduced into the water stream in an amount of from 0.5 ppm to 100 ppm.

According to another aspect, this disclosure provides a method of inhibiting corrosion of a corrodible metal surface that contacts a water stream in a water system. The method includes introducing into the water stream at least one non-triazole compound that is selected from a bicinchoninic acid, an acyl sarcosine, a fatty imidazoline, 8-hydroxyquinoline, a polyamine, a hydroxynapthalene sulfonate, a halogenated imidazole, an alkyl pyridine quat, a modified tertiary amine, an ethoxylated oleylamine, an alkyl dithiophosphate, adenosine, tryptophan, an alkyl thioethylamine, an ethoxylated tallow diamine, an imidazole carboxylate, a urea amine blend, and a fatty diamine.

DETAILED DESCRIPTION OF EMBODIMENTS

Figure 1:
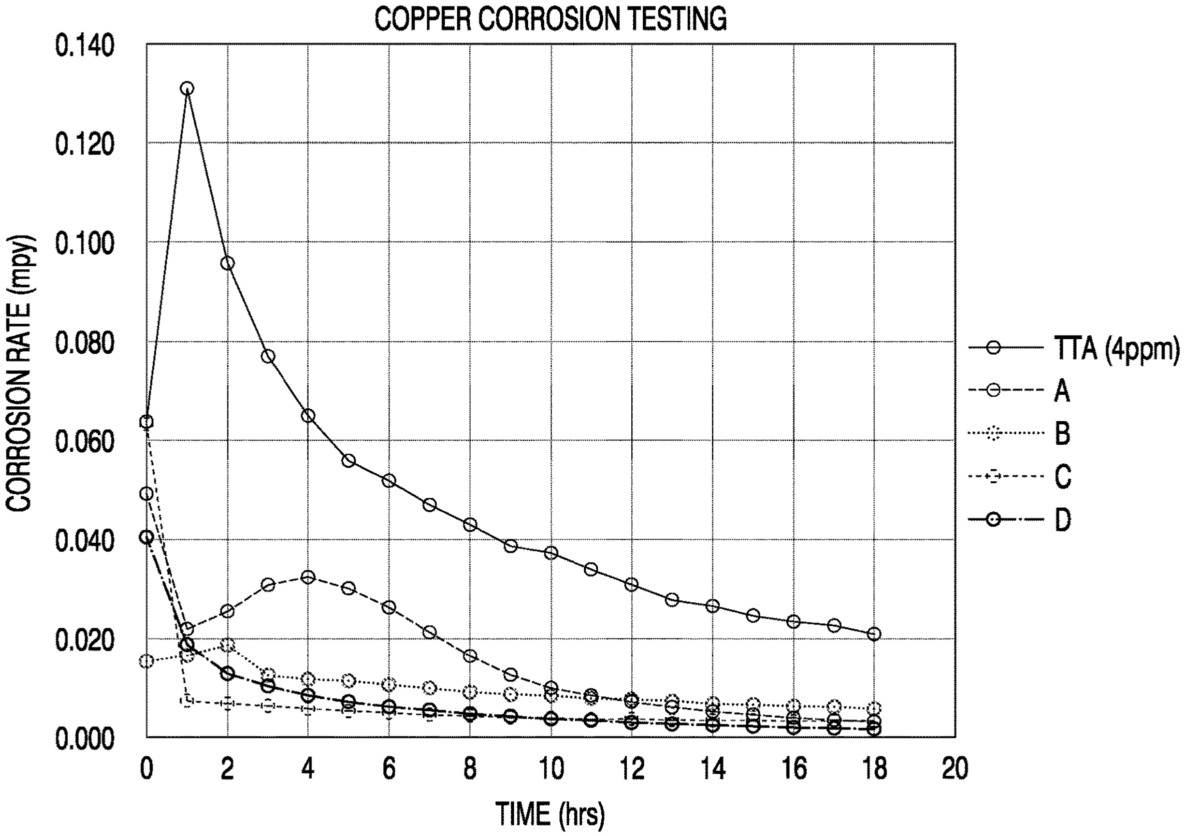
FIG. 1 is a graph showing the corrosion of a copper surface when treated with glucamide corrosion inhibitors and a conventional triazole corrosion inhibitor.

This disclosure provides novel non-triazole chemistries that are effective to prevent corrosion of metal surfaces in contact with water. The non-triazole corrosion inhibitors overcome several of the drawbacks of known triazole-based corrosion inhibitors.

In embodiments, the non-triazole compounds can be represented by Formula (I), Formula (II), or Formula (III) below.

Formula (I)

(I)

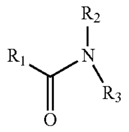

In Formula (I), $R_1$ is a polyhydroxy group. The polyhydroxy group can include, for example, 2-25 carbon atoms, from 3 to 10 carbon atoms, or from 4 to 7 carbon atoms, and can be linear, branched, cyclic, or heterocyclic, aliphatic or aromatic, saturated or unsaturated. The polyhydroxy group can include from 2 to 24 hydroxyl groups, from 2 to 9 hydroxyl groups, or from 3 to 6 hydroxyl groups, for example. The polyhydroxy group can consist solely of hydroxyl groups, carbon, and hydrogen, or alternatively may include heteroatoms in the hydrocarbon backbone. In some embodiments, the polyhydroxy group is a linear chain having 5 or 6 carbon atoms with 5 or 6 hydroxyl groups. In some embodiments, the polyhydroxy group includes one or more monosaccharide, disaccharide, or trisaccharide moieties.

In Formula (I), $R_2$ and $R_3$ can be independently selected from hydrogen or a hydrocarbon group with the proviso that at least one of $R_2$ and $R_3$ includes a hydrocarbon group. The hydrocarbon group can be linear, branched, cyclic or heterocyclic, aliphatic or aromatic, saturated or unsaturated. The hydrocarbon group can include from 2 to 20 carbon atoms, from 3 to 10 carbon atoms, or from 4 to 7 carbon atoms, for example. The hydrocarbon group can include one or more of the following atoms/moieties: halogen, heteroatom, amino, aminoalkyl, cyano, alkoxy, hydroxyl, thiol, alkythiol, carbonyl, nitro, phosphoryl, phosphonyl, sulfonyl. If heterocyclic groups are present, they can include an imidazole or a pyridine group, for example. If non-cyclic, the hydrocarbon group can be terminated with an amine or hydroxyl group, for example. If the hydrocarbon group includes heteroatoms, the heteroatoms can be present in the hydrocarbon backbone in numbers of, for example, 1, 2, 3, or 4 heteroatoms, including, e.g., N, O, S. The hydrocarbon group can also be substituted with a halogen atom. In some embodiments $R_2$ and $R_3$ can form a ring with the nitrogen atom in Formula (I), and in such cases $R_2$ and $R_3$ shall each be deemed to include a hydrocarbon group and share the number of carbon atoms in the ring. In some embodiments, if $R_2$ and $R_3$ form a ring with the nitrogen atom in Formula (I), the ring can include 4 to 7 carbon atoms, 3 to 5 carbon atoms, can optionally form a bicyclic or tricyclic ring, and may optionally also include an oxygen atom, or an additional nitrogen atom. This ring can include, for example, an imidazole moiety. The compound of Formula (I) does not include any triazole groups, and preferably does not include any tetrazole groups.

Compounds of Formula (I) can be synthesized by reacting a polyhydroxy compound with an amine compound. Exemplary polyhydroxy compounds that can be used in the reaction include derivatives of sugars, sugar acids, polysaccharides, gluconic acid, lactones of sugar acids, and lactones of gluconic acid (e.g., glucono delta lactone). Exemplary amine compounds that can be used include primary amines, secondary amines, diamines (e.g., dimethylaminopropylamine), triamines (e.g., diethylene triamine), cyclic or heterocyclic amines (e.g., morpholine), ethoxyamines (e.g., 3-methoxy propyl amine), alkanolamines (e.g., aminoethyl ethanolamine), imidazolidinones (e.g., 1-(2-hydroxyethyl)-2-imidazolidinone), imidazolines, imidazole, pyrazoles, piperazines (e.g., 1-(2-hydroxyethyl) piperazine), piperidines, and pyrrolidines.

An exemplary reaction mechanism for synthesizing a compound of Formula (I) is shown below, in which glucono delta lactone is reacted with morpholine in an approximately 1:1 molar ratio to produce a glucamide.

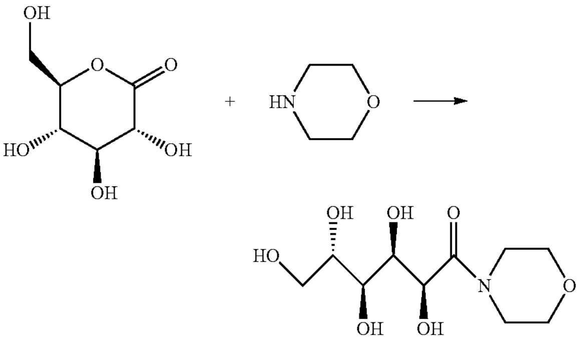

This compound, as well as other glucamide compounds, and other compounds of Formula (I), have been found to be effective to prevent corrosion of metal surfaces in aqueous environments. Other exemplary glucamides of Formula (I) are shown below:

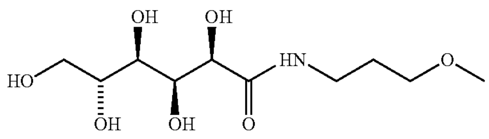
,

-continued

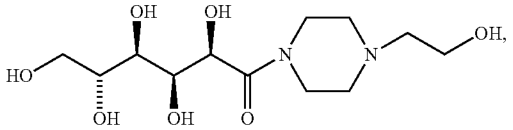

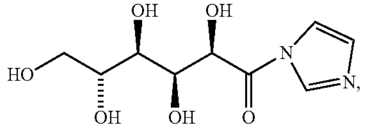

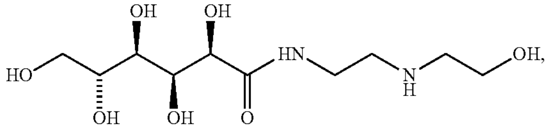

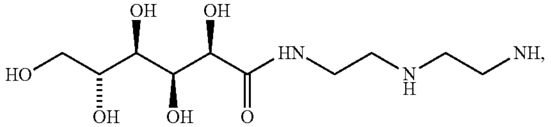

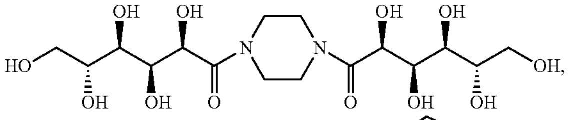

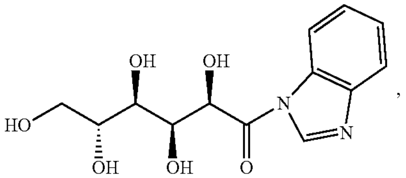

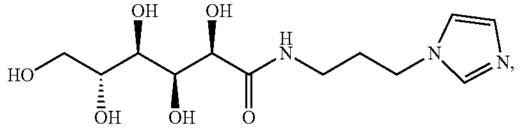

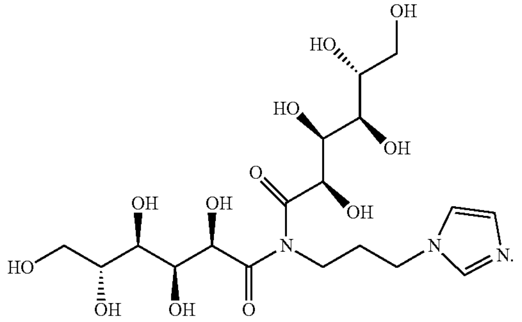

Formula (II)

(II)

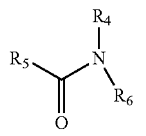

In Formula (II), R4 is a polyhydroxy group. The polyhydroxy group can include, for example, 2-25 carbon atoms, from 3 to 10 carbon atoms, or from 4 to 7 carbon atoms, and can be linear, branched, cyclic, or heterocyclic, aliphatic or aromatic, saturated or unsaturated. The polyhydroxy group can include from 2 to 24 hydroxyl groups, from 2 to 9 hydroxyl groups, or from 3 to 6 hydroxyl groups, for example. The polyhydroxy group can consist solely of hydroxyl groups, carbon, and hydrogen, or alternatively may include heteroatoms in the hydrocarbon backbone. In some embodiments, the polyhydroxy group is a linear chain having 5 or 6 carbon atoms with 5 or 6 hydroxyl groups. In some embodiments, the polyhydroxy group includes one or more monosaccharide, disaccharide, or trisaccharide moieties.

$R_5$ is a hydrocarbon group. The hydrocarbon group can be linear, branched, cyclic or heterocyclic, aliphatic or aromatic, saturated or unsaturated. The hydrocarbon group can include from 2 to 20 carbon atoms, from 3 to 10 carbon atoms, or from 4 to 7 carbon atoms, for example. The hydrocarbon group can include one or more of the following atoms/moieties: halogen, heteroatom, amino, aminoalkyl, cyano, alkoxy, hydroxyl, polyhydroxyl, thiol, alkythiol, carbonyl, nitro, phosphoryl, phosphonyl, sulfonyl. If non-cyclic, the hydrocarbon can be terminated with an amine or hydroxyl group. If the hydrocarbon group includes heteroatoms, the heteroatoms can be present in the hydrocarbon backbone in numbers of, for example, 1, 2, 3, or 4 heteroatoms, including, e.g., N, O, S, and the hydrocarbon group can also be substituted with a halogen atom. If aromatic groups are present, they can include heterocyclic aromatic groups, including a pyridine group, for example.

$R_6$ is selected from hydrogen or a hydrocarbon group. The hydrocarbon group can be linear, branched, or cyclic, aliphatic or aromatic, saturated or unsaturated. The hydrocarbon group can include from 1 to 10 carbon atoms, from 1 to 5 carbon atoms, or from 1 to 3 carbon atoms, such as a methyl group, for example. The hydrocarbon group can include one or more of the following atoms/moieties: halogen, heteroatom, amino, aminoalkyl, cyano, alkoxy, hydroxyl, polyhydroxyl, thiol, alkythiol, carbonyl, nitro, phosphoryl, phosphonyl, sulfonyl. Formula (II) does not include any triazole groups, and preferably does not include any tetrazole groups.

Compounds of Formula (II) can be synthesized by reacting a polyhydroxy amine compound with a hydrocarbon compound. An exemplary polyhydroxy amine compound that can be used in the reaction is a glucamine. The hydrocarbon compound can include a group that reacts with the amine of the polyhydroxy amine, including at least one of an acid chloride, amide, and ester group.

An exemplary reaction mechanism for synthesizing a compound of Formula (II) is shown below, in which glucamine is reacted with a pyridinecarboxylic acid methyl ester in an approximately 1:1 molar ratio.

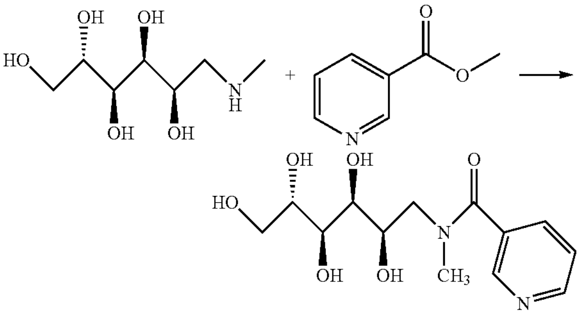

Other exemplary compounds of Formula (II) are shown below:

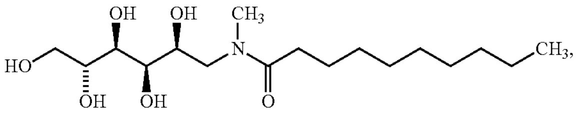

-continued

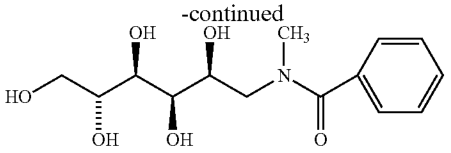,

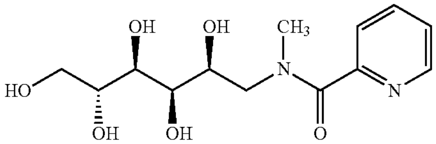

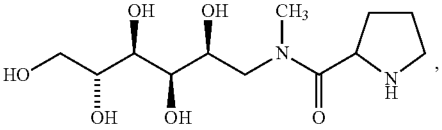,

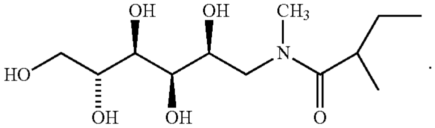.

Formula (III)

(III)

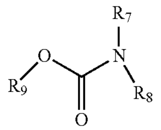

In Formula (III), $R_7$ and $R_8$ can be independently selected from hydrogen or a hydrocarbon group with the proviso that at least one of $R_7$ and $R_8$ includes a hydrocarbon group. The hydrocarbon group can be linear, branched, cyclic or heterocyclic, aliphatic or aromatic, saturated or unsaturated. The hydrocarbon group can include from 2 to 20 carbon atoms, from 3 to 10 carbon atoms, or from 4 to 7 carbon atoms, for example. The hydrocarbon group can include one or more of the following atoms/moieties: halogen, heteroatom, amino, aminoalkyl, cyano, alkoxy, hydroxyl, polyhydroxyl, thiol, alkythiol, carbonyl, nitro, phosphoryl, phosphonyl, sulfonyl. If the hydrocarbon group of $R_7$ and/or $R_8$ includes heteroatoms, the heteroatoms can be present in the hydrocarbon backbone in numbers of, for example, 1, 2, 3, or 4 heteroatoms, including, e.g., N, O, S, and the hydrocarbon can also be substituted with a halogen atom. In some embodiments, the hydrocarbon group of $R_7$ and/or $R_8$ can include a polyhydroxy group. The polyhydroxy group can include from 2 to 24 hydroxyl groups, from 2 to 9 hydroxyl groups, or from 3 to 6 hydroxyl groups, for example. The polyhydroxy group can consist solely of hydroxyl groups, carbon, and hydrogen, or alternatively may include heteroatoms in the hydrocarbon backbone. In some embodiments, $R_7$ and $R_8$ can form a ring with the nitrogen atom in Formula (III), and in such cases $R_7$ and $R_8$ shall each be deemed to include a hydrocarbon group and share the number of carbon atoms in the ring. In some embodiments, if $R_7$ and $R_8$ form a ring with the nitrogen atom in Formula (III), the ring can include 4 to 7 carbon atoms, or 3 to 5 carbon atoms, can optionally form a bicyclic or tricyclic ring, and may optionally also include an oxygen atom, or an additional nitrogen atom. The ring can include, for example, an imidazole moiety.

$R_9$ is a hydrocarbon group that includes at least one hydroxyl group (e.g., 1 to 3 hydroxyl groups). The hydrocarbon group can be linear, branched, cyclic, or heterocyclic, aliphatic or aromatic, saturated or unsaturated. The hydrocarbon group can include from 2 to 20 carbon atoms, from 2 to 10 carbon atoms, or from 3 to 5 carbon atoms, for example. In some embodiments, the hydrocarbon group includes 2 to 4 carbon atoms and a single hydroxyl group. The hydrocarbon group can also include one or more of the following atoms/moieties: halogen, heteroatom, amino, aminoalkyl, cyano, alkoxy, thiol, alkythiol, carbonyl, nitro, phosphoryl, phosphonyl, sulfonyl. The compound of Formula (III) does not include any triazole groups, and preferably does not include any tetrazole groups.

In embodiments, compounds of Formula (III) can be synthesized by reacting a cyclic carbonate ester with an amine. The cyclic carbonate ester can include an ethylene carbonate or propylene carbonate, for example. Exemplary amine compounds that can be used include primary amines, secondary amines, diamines (e.g., dimethylaminopropylamine), triamines (e.g., diethylene triamine), cyclic or heterocyclic amines (e.g., morpholine), ethoxyamines (e.g., 3-methoxy propyl amine), alkanolamines (e.g., aminoethyl ethanolamine), polyhydroxy amines (e.g., glucamine), imidazolidinones (e.g., 1-(2-hydroxyethyl)-2-imidazolidinone), imidazolines, imidazole, pyrazoles, piperazines (e.g., 1-(2-hydroxyethyl) piperazine), piperidines, and pyrrolidines.

An exemplary reaction mechanism for synthesizing a compound of Formula (III) is shown below, in which propylene carbonate is reacted with imidazole in an approximately 1:1 molar ratio.

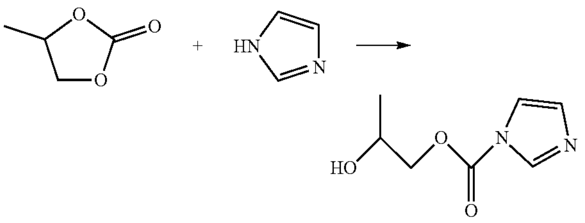

Other exemplary compounds of Formula (III) are shown below:

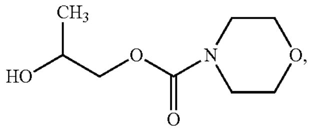

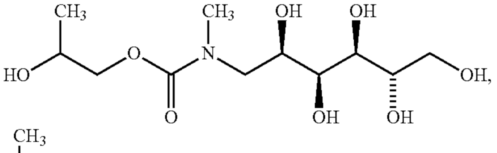

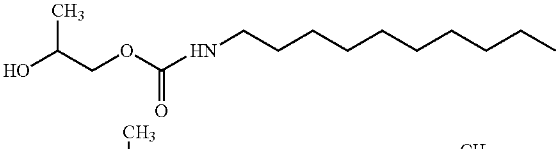,

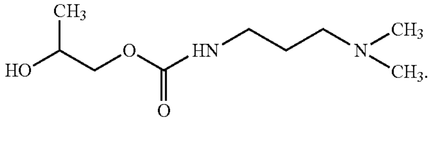

Other Non-Triazole Compounds

In addition to Formulas (I), (II), and (III) above, a fourth class of non-triazole compounds that may be useful as corrosion inhibitors can be formed by reacting a compound with multiple carboxylic acid groups, including dicarboxylic acids (e.g., 1H-imidazole-4,5 dicarboxylic acid) or tricarboxylic acids with an amine compound. Exemplary amine compounds that can be used include primary amines, secondary amines, diamines (e.g., dimethylaminopropylamine), triamines (e.g., diethylene triamine), cyclic or heterocyclic amines (e.g., morpholine), ethoxyamines (e.g., 3-methoxy propyl amine), alkanolamines (e.g., aminoethyl ethanolamine), imidazolidinones (e.g., 1-(2-hydroxyethyl)-2-imidazolidinone), imidazolines, imidazole, pyrazoles, piperazines (e.g., 1-(2-hydroxyethyl) piperazine), piperidines, and pyrrolidines.

In addition to the above chemistries, other non-triazole/non-tetrazole compounds that may be useful as corrosion inhibitors in embodiments of the invention include aromatic nitrogen compounds (e.g., bicinchoninic acid, 8-hydroxyquinoline, hydroxynaphthalene sulfonate), amino acid or glycosylamine derivatives (e.g., acyl sarcosines, adensine, tryptophan), imidazoline derivatives (e.g., fatty imidazolines, halogenated imidazoles, imidazole carboxylates, benzimidazole), amine derivatives (e.g., polyamines, alkyl pyridine quat, modified tertiary amines, ethoxylated oleylamines, ethoxylated tallow diamines, urea amine blend, fatty diamines), and sulfur containing compounds (e.g., alkyl dithiophosphates, alkyl thioethylamines).

Treatment Methods

At least one non-triazole compound described above can be combined with water that is in contact with a metal surface to inhibit or prevent corrosion of the metal surface. In embodiments, the non-triazole compound may be introduced into open or closed water systems. Further, the non-triazole compound can be applied to the water stream while the water system is on-line. The methods of inhibiting corrosion can be used in aqueous systems including, but not limited to cooling water, cooling towers, water distribution systems, boilers, pasteurizers, water and brine carrying pipelines, storage tanks and the like. In general, water in these aqueous systems is at least 90 wt. % water, at least 95 wt. % water, or at least 99 wt. % water.

At least one non-triazole compound described above can be combined with the water in the water system in amounts that are effective to form a film of the non-triazole compound(s) on the metal surface and reduce corrosion of the metal surface to a desired degree. The at least one non-triazole compound can be added so that the non-triazole compound is present in the water in amounts of from 0.01 ppm to 500 ppm, from 0.5 ppm to 100 ppm, from 1 ppm to 50 ppm, or from 2 ppm to 15 ppm, for example. The non-triazole compounds can be added to the water continuously, periodically, or intermittently.

The compounds can be added in response to a measured parameter of the water or of the metal surface, including when a measured amount of corrosion inhibitor drops below a predetermined threshold.

The non-triazole compounds can be added to the water in the form of a powder or an aqueous solutions. If added as an aqueous solution, the non-triazole compound can be present in amounts of from 1 to 60 wt. % or from 5 to 40 wt. %, for example.

The metal surface that is in contact with the treated water can include ferrous metals such as steel (e.g., mild steel, stainless steel, etc.), aluminum and its alloys, and yellow metals (e.g., copper and copper-based alloys including bronzes, brasses, etc.). In one aspect, it has been discovered that non-triazole compounds are particularly useful in inhibiting corrosion of yellow metals. In this regard, the non-triazole compounds, and in particular compounds with polyhydroxy groups such as glucamide and glucono-imidazoline derivatives, can prevent corrosion on yellow metals by forming an insoluble protective film on the surface. It is believed that the film is stabilize by a molecular bond with the organic inhibitor and copper and prevents surface interaction with corrosive species.

The non-triazole inhibitors have improved aquatic toxicity, as compared to conventional azole inhibitors. Accordingly, in some embodiments, the treated water that is in contact with the metal surface is free of or substantially free of triazole compounds, e.g., less than 5 ppm triazole compounds, less than 1 ppm triazole compounds, or less than 0.1 ppm triazole compounds. In particular, the treated water can be free of or substantially free of tolyltriazole, benzotriazole, and chlorinated tolyltriazole.

In some embodiments, the non-triazole inhibitors can be added to the water in combination with other inhibitor treatment agents including triazoles, polymers, phosphonates, and/or phosphates.

The non-triazole corrosion inhibitors also have improved halogen stability, and remain effective to inhibit corrosion even in the water that contains halogen-containing biocides or free chlorine. In this regard, it is believed that these halogens do not substantially disrupt the film formed by the above-referenced non-triazole corrosion inhibitors and do not degrade those compounds in the bulk water. Accordingly, in some embodiments, the treated water that is in contact with the metal surface includes at least 0.1 ppm of a halogen-containing biocide and/or free chlorine, at least 0.5 ppm, at least 1 ppm, or from 1 ppm to 10 ppm. Halogen-containing biocides may include, for example, hypochlorous acid or hypobromous acid. Likewise, in some embodiments, methods of the invention include combining a halogen-containing biocide with the treated water in addition to the non-triazole compound.

In addition to the non-triazole corrosion inhibitor, other components can be added to the water as part of the treatment, including chelating agents, scale inhibitors, dispersants, biocides (such as the halogen-containing biocide noted above), and combinations thereof. These components can be included as part of a treatment composition with the non-triazole corrosion inhibitor or can be added to the water separately. Suitable chelating agents include, for example, citric acid, 2-Butenedioic acid (Z), and their derivatives. Suitable scale inhibitors and dispersants can include one or more of unsaturated carboxylic acid polymers such as polyacrylic acid, homo or co-polymaleic acid (synthesized from solvent and aqueous routes); acrylate/2-acrylamido-2-methylpropane sulfonic acid (APMS) copolymers, acrylate/acrylamide copolymers, acrylate homopolymers, terpolymers of carboxylate/sulfonate/maleate, terpolymers of acrylic acid/AMPS; phosphonates and phosphinates including 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), diethylenetriamine penta(methylene phosphonic acid) (DETPMP), phosphinosuccinic oligomer (PSO); salts of molybdenum and tungsten including nitrates and nitrites; amines such as N,N-diethylhydroxylamine (DEHA), diethyl amino ethanol (DEAE), dimethylethanol amine (DMAE), cyclohexylamine, morpholine, and monoethanolamine (MEA).

In some embodiments, one or more fluorescent agents can be combined with the non-triazole inhibitor or added to the water together with the non-triazole inhibitor to detect and quantify the amount of inhibitor in the water. In embodiments, the fluorescent agents can include a reactive chemical tracer (e.g., PTSA) that interacts with the non-triazole group in a way that affects the fluorescence intensity and a non-reactive chemical tracer such as a tagged polymer. Suitable fluorescent agents that can be used are described in U.S. Pat. No. 10,024,751, the entirety of which is incorporated by reference herein.

Example 1

Several non-triazole glucamide compounds and tolyltriazole (as a comparative example) were tested to determine their potential to inhibit corrosion of copper in aqueous systems.

1 liter samples of synthetic water were each dosed with 5 ppm of a different glucamide compound (A, B, C, D) according to Formula (I) above and 50 ppm of a standard scale inhibitor. Another 1 liter sample of synthetic water was dosed with 4 ppm of tolyltriazole and 50 ppm of the standard scale inhibitor product. The composition of the synthetic water is shown in Table I below.

TABLE 1

| | |
|---|---|
| pH | 7.9 |
| Ca as CaCO3 | 600 ppm |
| Mg as CaCO3 | 300 ppm |
| Sulfate | 600 ppm |
| Malk as CaCO3 | 75 ppm |
| Silica as SiO2 | 10 ppm |
| Chloride | 430 ppm |

The apparatus used for the corrosion testing was a Gamry Multiport Corrosion Cell and Gamry Reference 600+ potentiostat with multiplexor. Copper coupons (CDA110) were added to the sample cells, and the cells were heated to 50° C. and maintained at this temperature throughout the testing. The cells were continuously stirred at a speed of 350 rpm. A cylindrical working electrode was submerged into the test solutions, and an LPR sweep (linear polarization resistance) was performed every hour for 18 hours. After the one hour mark, 1 ppm of free chlorine was dosed into the corrosion cell.

The corrosion rates (in mpy) over the 18 hour period are shown in FIG. 1. As can be seen, the glucamide compounds of Formula (I) exhibit superior corrosion inhibition properties over the entire 18 hour period as compared to the triazole inhibitor. And, unlike the triazole inhibitor, the glucamide corrosion inhibitors do not exhibit any substantial deterioration in corrosion resistance when free chlorine is added.

Example 2

Several other classes of non-triazole compounds were tested to determine their potential to inhibit corrosion of copper in aqueous systems using the same testing procedures as in Example 1. These additional classes non-triazole compounds are bicinchoninic acid, acyl sarcosine, fatty imidazoline, 8-hydroxyquinoline, polyamine, hydroxynapthalene sulfonate, halogenated imidazole, alkyl pyridine quat, modified tertiary amine, ethoxylated oleylamine, alkyl dithiophosphate, adenosine, tryptophan, alkyl thioethylamine, ethoxylated tallow diamine, imidazole carboxylate, urea amine blend, and fatty diamine.

Figure 2:
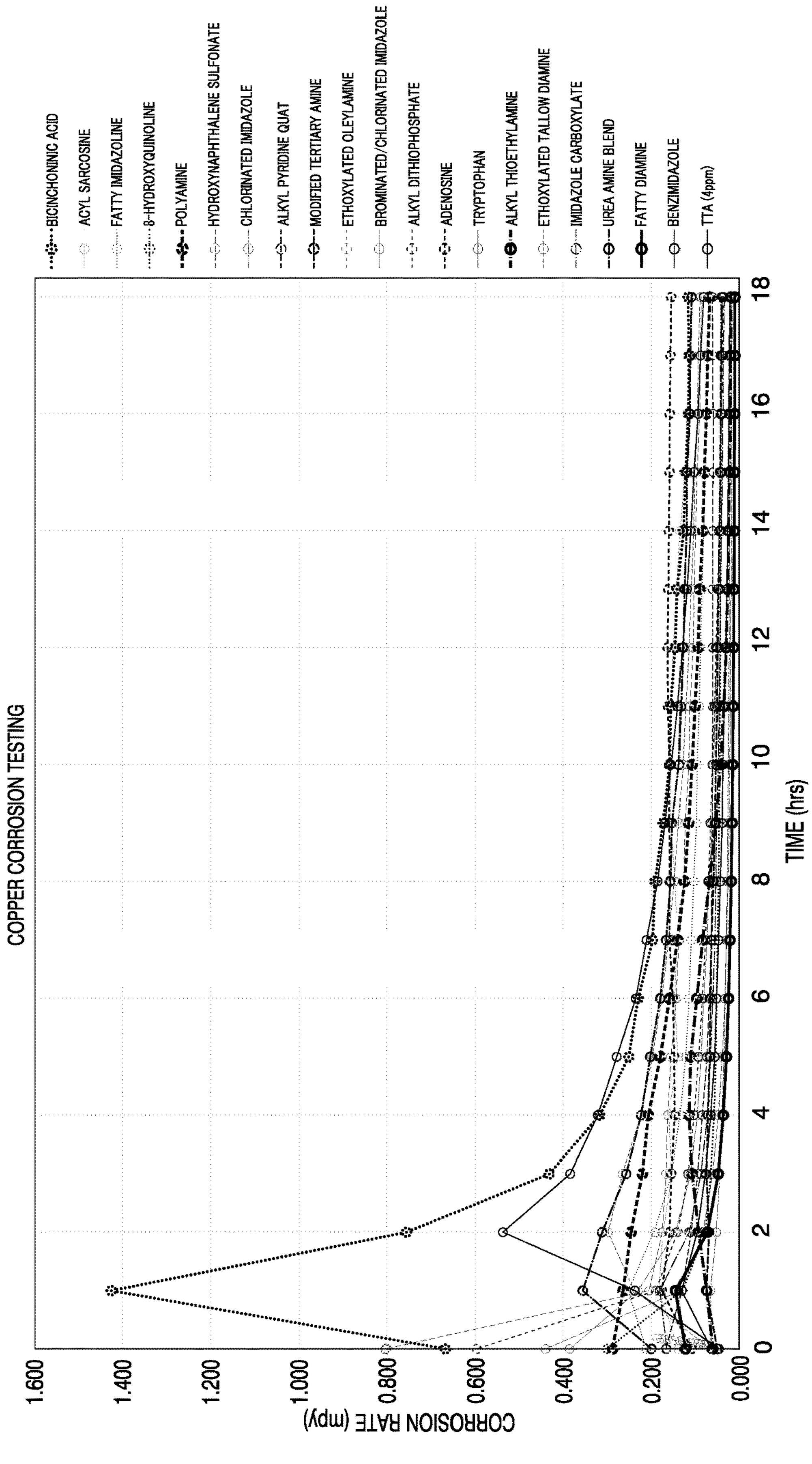
FIG. 2 is a graph showing the corrosion of a copper surface when treated with other non-triazole corrosion inhibitors.

The corrosion rates (in mpy) over the 18 hour period are shown in FIG. 2. As can be seen, these non-triazole compounds exhibit beneficial corrosion resistance over the 18 hour testing period.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method of inhibiting corrosion of a corrodible metal surface that contacts a water stream in a water system, the method comprising:

introducing into the water stream at least one non-triazole compound that is selected from a compound that is represented by Formula (I), Formula (II), or Formula (III) below:

(I)

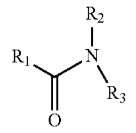

(II)

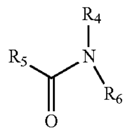

(III)

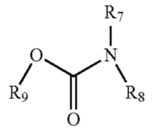

in which $R_1$ is a polyhydroxy group; $R_2$ and $R_3$ are independently selected from a hydrogen or a hydrocarbon group with the proviso that at least one of $R_2$ and $R_3$ includes a hydrocarbon group having from 2 to 7 carbon atoms; $R_4$ is a polyhydroxy group; $R_5$ is a cyclic or heterocyclic hydrocarbon group; $R_6$ is a hydrogen or a hydrocarbon group; $R_7$ and $R_8$ are independently selected from a hydrogen or a hydrocarbon group with the proviso that at least one of $R_7$ and $R_8$ includes a hydrocarbon group; and $R_9$ is a hydrocarbon group that includes at least one hydroxyl group.

2. The method of claim 1, wherein the at least one non-triazole compound is selected from a compound of Formula (I), and wherein $R_1$ is a polyhydroxy group with 2 to 25 carbon atoms and from 2 to 24 hydroxyl groups, and at least one of $R_2$ and $R_3$ includes a hydrocarbon group with from 4 to 7 carbon atoms.

3. The method of claim 2, wherein $R_1$ is a polyhydroxy group with 4 to 7 carbon atoms and 3 to 6 hydroxyl groups.

4. The method of claim 2, wherein $R_2$ and $R_3$ form a ring with the nitrogen atom in Formula (I).

5. The method of claim 4, wherein the ring includes 4 to 7 carbon atoms.

6. The method of claim 5, wherein the ring includes a heteroatom in addition to the nitrogen atom of Formula (I).

7. The method of claim 1, wherein the non-triazole compound is a glucamide compound of Formula (I).

8. The method of claim 7, wherein the corrodible metal surface is a yellow metal.

9. The method of claim 1, wherein the at least one non-triazole compound is selected from a compound of Formula (II), and wherein $R_4$ is a polyhydroxy group with 2 to 25 carbon atoms and 2 to 24 hydroxyl groups; $R_5$ is a heterocyclic hydrocarbon group; and $R_6$ is a hydrogen or a hydrocarbon group with 1 to 5 carbon atoms.

10. The method of claim 1, wherein the at least one non-triazole compound is selected from a compound of Formula (III), and wherein at least one of $R_7$ and $R_8$ includes a hydrocarbon group with 2 to 20 carbon atoms.

11. The method of claim 1, wherein the at least one non-triazole compound is introduced into the water stream in an amount of from 0.01 ppm to 500 ppm.

12. The method of claim 1, further comprising introducing into the water stream a halogen-containing biocide in an amount of at least 0.1 ppm.

13. A method of inhibiting corrosion of a yellow metal that contacts a water stream in a water system, the water stream including at least one of hypochlorous acid and hypobromous acid in an amount of at least 0.1 ppm, the method comprising:

introducing into the water stream at least one non-triazole compound that is selected from a compound that is represented by Formula (I):

(I)

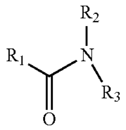

in which $R_1$ is a polyhydroxy group with 3 to 10 carbon atoms and 2 to 9 hydroxyl groups, and $R_2$ and $R_3$ are independently selected from a hydrogen or a hydrocarbon group with the proviso that at least one of $R_2$ and $R_3$ includes a hydrocarbon group with 3 to 10 carbon atoms, and wherein the at least one non-triazole compound is introduced into the water stream in an amount of from 0.5 ppm to 100 ppm.

14. The method of claim 13, wherein the yellow metal is at least one of copper, brass, and bronze.

15. A method of inhibiting corrosion of a corrodible metal surface that contacts a water stream in a water system, the method comprising:

introducing into the water stream at least one non-triazole compound that is selected from a compound that is represented by Formula (I) below:

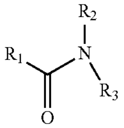

in which $R_1$ is a polyhydroxy group with 2 to 25 carbon atoms and from 2 to 24 hydroxyl groups, and at least one of $R_2$ and $R_3$ includes a hydrocarbon group with from 2 to 20 carbon atoms, and $R_2$ and $R_3$ form a ring with the nitrogen atom in Formula (I).

* * * * *